US012538146B2

(12) United States Patent
Mehta et al.

(10) Patent No.: US 12,538,146 B2
(45) Date of Patent: *Jan. 27, 2026

(54) MICROSERVICES FOR CENTRALIZED UNIT USER PLANE (CU-UP) AND CENTRALIZED UNIT CONTROL PLANE (CU-CP) STANDBY PODS IN A CLOUD-NATIVE FIFTH GENERATION (5G) WIRELESS TELECOMMUNICATION NETWORK

(71) Applicant: Boost SubscriberCo L.L.C., Englewood, CO (US)

(72) Inventors: Dhaval Mehta, Aldie, VA (US); Sourabh Gupta, Ashburn, VA (US); Gurpreet Sohi, Parker, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 419 days.

This patent is subject to a terminal disclaimer.

(21) Appl. No.: 17/988,695

(22) Filed: Nov. 16, 2022

(65) Prior Publication Data

US 2023/0337019 A1    Oct. 19, 2023

Related U.S. Application Data

(60) Provisional application No. 63/331,686, filed on Apr. 15, 2022.

(51) Int. Cl.
*H04W 24/04* (2009.01)
(52) U.S. Cl.
CPC .................. *H04W 24/04* (2013.01)

(58) Field of Classification Search
CPC ..... H04W 24/04; H04W 24/02; H04W 28/00; H04W 28/02; H04W 28/205; H04W 28/021
See application file for complete search history.

(56) References Cited

U.S. PATENT DOCUMENTS

2017/0244593 A1   8/2017   Rangasamy et al.
2022/0391294 A1*  12/2022  Kulkarni ............... G06F 9/5072
(Continued)

OTHER PUBLICATIONS

Anonymous: "5G Network Evolution with AWS Design scalable, secure, reliable, and cost-efficient cloud-native core and edge network on AWS", Jul. 31, 2020, pp. 1-48.
(Continued)

*Primary Examiner* — Asad M Nawaz
*Assistant Examiner* — Najeeb Ansari
(74) *Attorney, Agent, or Firm* — Jeremiah J. Baunach; Frontier IP Law PLLC (57) ABSTRACT

Example embodiments are directed towards detecting a failure of one or more microservices of a CU-UP pod or a CU-CP pod running on a first cloud compute instance within a node group of a cluster. In response to the detection of a failure of one or more microservices of a CU-UP pod or a CU-CP pod of a node group within a cluster being hosted on a first cloud compute instance, the system automatically switches to run the one or more microservices for which failure was detected on a standby pod running on a second cloud compute instance with user equipment (UE) context corresponding to the one or more microservices for which failure was detected. The standby pods running on the other cloud compute instance are generated with anti-affinity between the CU-CP microservices of the primary CNF instance and CU-CP microservices of the standby pod.

9 Claims, 6 Drawing Sheets

(56) References Cited

U.S. PATENT DOCUMENTS

2023/0055306 A1* 2/2023 Ghadge ............ H04W 28/0215
2024/0323707 A1* 9/2024 Chandrashekar ..... H04W 76/27

OTHER PUBLICATIONS

International Search Report and Written Opinion received for PCT Patent Application No. PCT/US23/018370, mailed on Jul. 19, 2023, 12 pages.

Vayghan, L. A., et al., "A Kubernetes controller for managing the availability of elastic microservice based stateful applications", Journal of Systems and Software, vol. 175, May 2021, pp. 1-15.

* cited by examiner

MICROSERVICES FOR CENTRALIZED UNIT USER PLANE (CU-UP) AND CENTRALIZED UNIT CONTROL PLANE (CU-CP) STANDBY PODS IN A CLOUD-NATIVE FIFTH GENERATION (5G) WIRELESS TELECOMMUNICATION NETWORK

TECHNICAL FIELD

The present disclosure relates generally to telecommunication networks, more particularly, to microservices for CU-UP and CU-CP standby pods in a cloud-native 5G wireless telecommunication network.

BRIEF SUMMARY

It is advantageous to provide Fifth Generation (5G) wireless technology in a highly available, flexible manner that avoids or reduces network outages and dropped calls experienced by ends users. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architecture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Generation Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architecture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of computing power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtualization (NFV) decouples software from hardware by replacing various network functions such as firewalls, load balancers and routers with virtualized instances running as software. This eliminates the need to invest in many expensive hardware elements and can also accelerate installation times, thereby providing revenue generating services to the customer faster.

NFV enables the 5G infrastructure by virtualizing appliances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation promoted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hardware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the Distributed Unit (DU), and the Radio Unit (RU), which can be deployed in multiple combinations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Embodiments, described herein may use containerization to implement such microservices. Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the Operating System (OS) among the applications. Therefore, containers are considered lightweight. A container has its own file system, share of CPU, memory and process space. As they are decoupled from the underlying infrastructure, they are portable across clouds and OS distributions.

A cluster is made up of nodes that run containerized applications. Each cluster also has a master (control plane) that manages the nodes and pods of the cluster. A node represents a single machine in a cluster, typically either a physical machine or virtual machine that's located either on-premises or hosted by a cloud service provider. Each node hosts groups of one or more containers (which run applications), and the master communicates with nodes about when to create or destroy containers and how to re-route traffic based on new container alignments. The Kubernetes master is the access point (or the control plane) from which administrators and other users interact with the cluster to manage the scheduling and deployment of containers.

A pod is the basic unit of scheduling for applications running on a cluster. The applications are running in containers, and each pod comprises one or more container(s). While pods are able to house multiple containers, one-container-per-pod may also be used. In some situations, containers that are tightly coupled and need to share resources may sit in the same pod. Pods can quickly and easily communicate with one another as if they were running on the same machine. They do still, however, maintain a degree of isolation. Each pod is assigned a unique IP address within the cluster, allowing the application to use ports without conflict.

Pods are designed as relatively ephemeral, disposable entities. When a pod gets created, it is scheduled to run on a node. The pod remains on that node until the process is terminated, the pod object is deleted, the pod is evicted for lack of resources, or the node fails. In Kubernetes, pods are the unit of replication. If an application becomes overly popular and a pod can no longer facilitate the load, Kubernetes can deploy replicas of the pod to the cluster.

Software container orchestration platforms, such as Amazon Elastic Kubernetes Service (Amazon EKS), are services for users to run Kubernetes on the cloud of a cloud computing service provider, such as Amazon Web Services (AWS), without the user needing to install, operate, and maintain their own Kubernetes control plane or nodes. An Amazon EKS cluster comprises of two primary components: the Amazon EKS control plane and Amazon EKS nodes that are registered with the control plane. The Amazon EKS control plane comprises of control plane nodes that run the Kubernetes software and the Kubernetes application programming interface (API) server. The control plane may run in an account managed by AWS or the telecommunication service provider, and the Kubernetes API is exposed via the Amazon EKS endpoint associated with the cluster. Each Amazon EKS cluster control plane is single-tenant and unique, and runs on its own set of Amazon Elastic Compute Cloud (EC2) instances, which provide scalable computing capacity in the Amazon Web Services (AWS) cloud. However, other types of cloud compute instances or virtual machine instances may be used on various other cloud computing provider service platforms. The cluster control plane may be provisioned across multiple Availability Zones (AZs) and fronted by an Elastic Load Balancing Network Load Balancer. Amazon EKS may also provision elastic network interfaces in VPC subnets to provide connectivity from the control plane instances to the nodes. Amazon EKS nodes may run in an AWS account of the telecommunication service provider and connect to the telecommunication service provider's cluster control plane via the API server endpoint and a certificate file that is created for the cluster.

As disclosed herein, NFs of the 5G NR cellular telecommunication network implemented in respective node groups are useful mechanisms for creating pools of resources in the 5G network that can enforce scheduling requirements. They also provide a utility for shifting workloads around in the 5G network during cluster management and updates. Such NFs of the 5G NR cellular telecommunication network may be hosted on a cloud service provider cloud and referred to herein as cloud-native network functions (CNFs).

Briefly described, embodiments disclosed herein are directed towards detecting a failure of one or more microservices of a CU-UP pod or a CU-CP pod running on a first cloud compute instance within a node group of a cluster. In response to the detection of a failure of one or more microservices of a CU-UP pod or a CU-CP pod of a node group within a cluster being hosted on a first cloud compute instance, the system automatically switches to run the one or more microservices for which failure was detected on a standby pod running on a second cloud compute instance with user equipment (UE) context corresponding to the one or more microservices for which failure was detected. The standby pods running on the other cloud compute instance are generated with anti-affinity between the CU-CP microservices of the primary CNF instance and CU-CP microservices of the standby pod.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
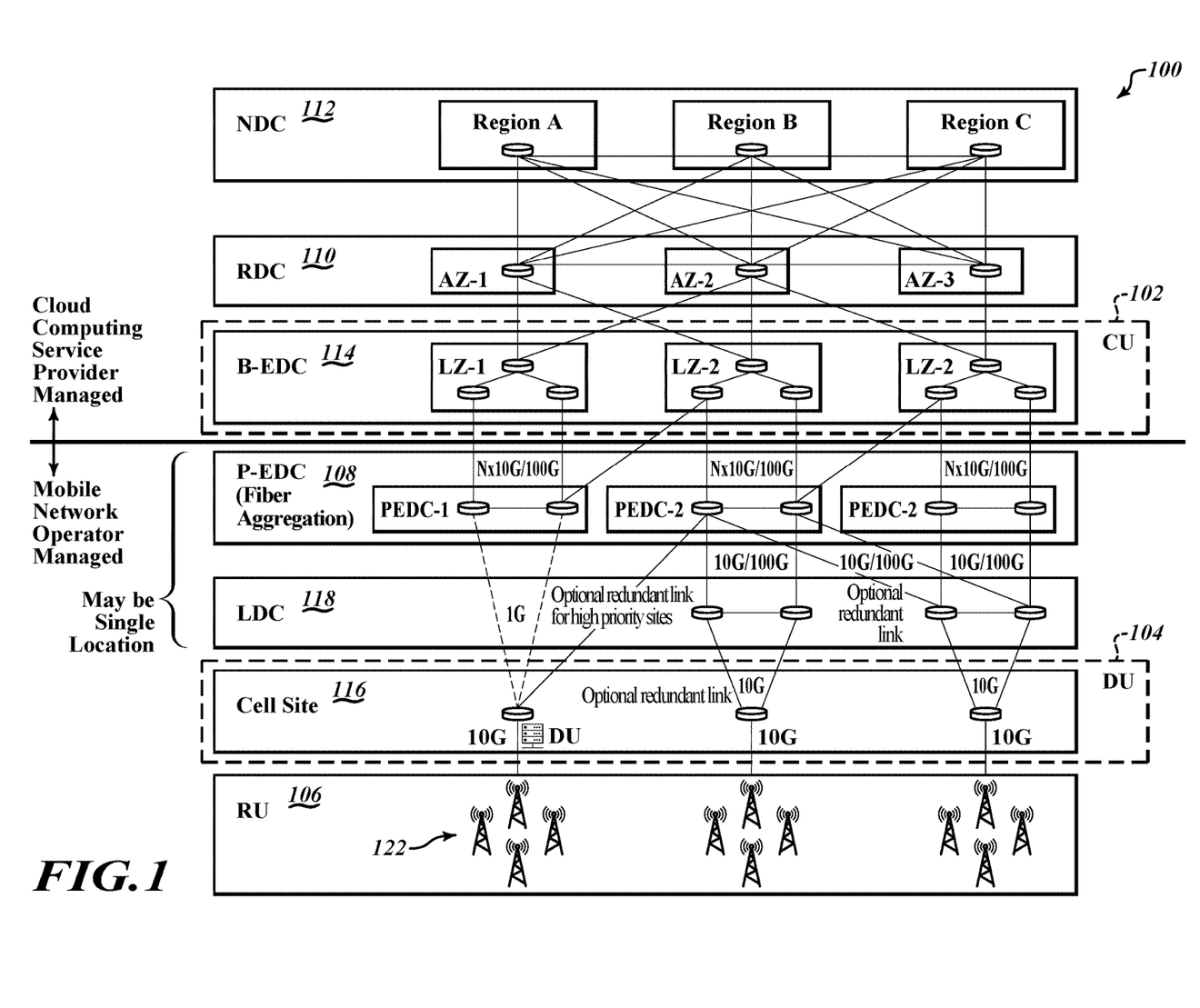
FIG. 1 illustrates a diagram of an example system architecture overview of a system in which CU-UP and CU-CP standby pods in a cloud-native 5G wireless telecommunication network may be implemented in accordance with embodiments described herein.

FIG. 1 illustrates a diagram of an example system architecture overview of a system 100 in which CU-UP and CU-CP standby pods in a cloud-native 5G wireless telecommunication network may be implemented in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack. The CU 102 is hosted within one or more local zones of the cloud computing service provider. For example, local zone 1 (LZ-1) 124. A local zone is a type of infrastructure deployment of the cloud computing service provider that places compute, storage, database, and/or other select cloud computing services closer to end users of the services and systems hosted by cloud computing service provider (e.g., closer to large population and industry centers). Local zones enable users of the cloud computing service provider cloud to use select cloud computing services, like compute and storage services, closer to more end-users, providing them very low latency access to the applications running locally. Local Zones are also connected to the parent region (e.g., Region A, Region B and/or Region C shown in FIG. 1) via the cloud service provider's redundant and very high bandwidth private network, giving applications running in local zones fast, secure, and seamless access to the rest of the cloud computing services.

As shown in FIG. 1, the radio unit (RU) 106 converts radio signals sent to and from the antenna of base stations 122 into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cell site 116 itself or can be hosted in an edge cloud (local data center (LDC) 118 or central office) depending on transport availability and fronthaul interface. DUs from multiple cell sites may be pooled and col-located at one LDC 118. The CU's server and relevant software may be hosted in a regional cloud data center or, as shown in FIG. 1, in a breakout edge data center (B-EDC) 114. As shown in FIG. 1, the DU 104 may be provisioned to communicate via a pass through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. The CU 102 may be connected to a regional cloud data center (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. In some embodiments, the P-EDC 108, LDC 118 and cell site 116 may be at a single location or facility (e.g., a colocation data center). In other embodiments, the B-EDC 114, the P-EDC 108, the LDC 118 and cell site 116 may be at a single location or facility (e.g., a colocation data center). According to various embodiments, the actual split between DU and RU may be different depending on the specific use-case and implementation.

Figure 2A:
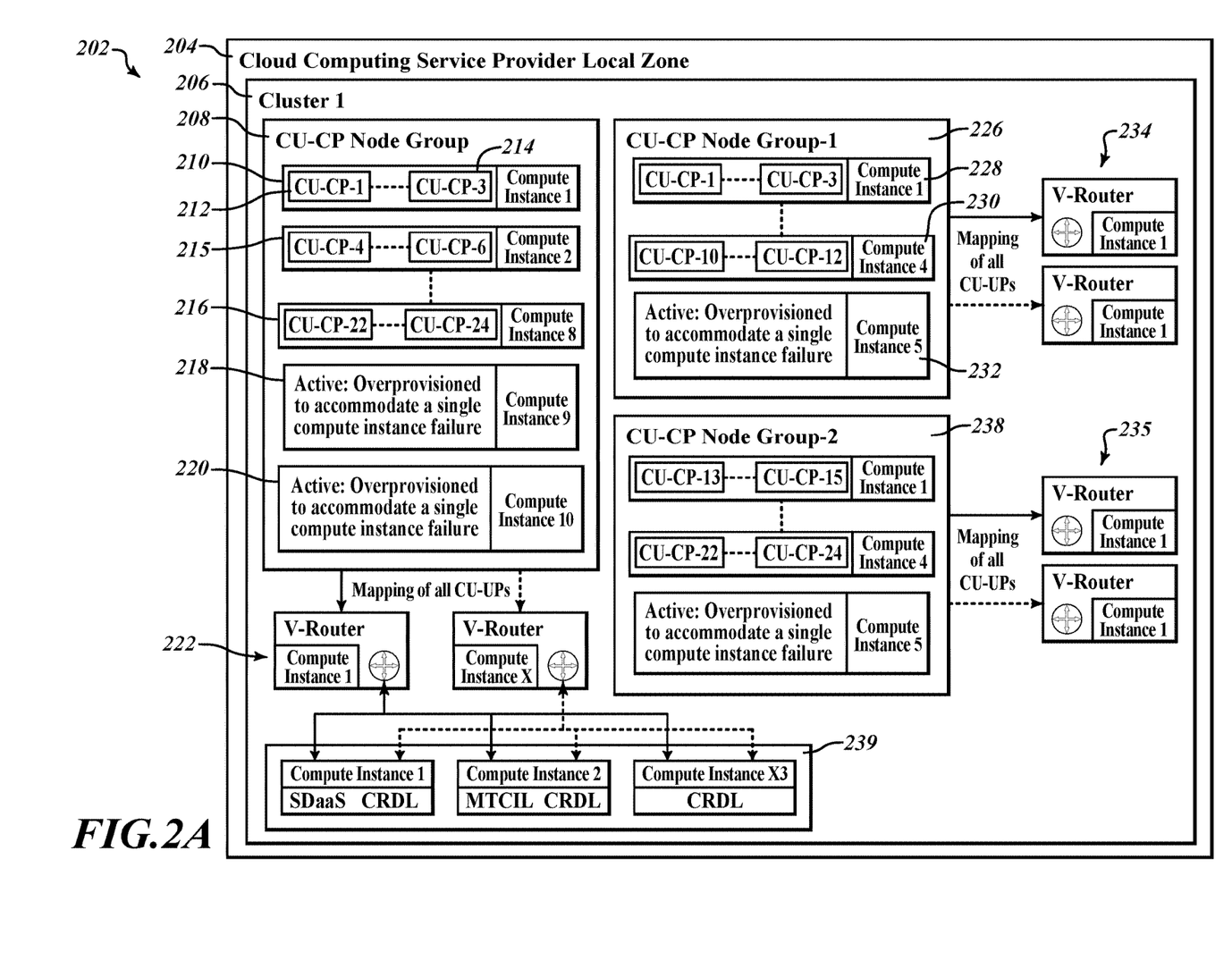
FIG. 2A is a diagram of a cloud-native system for CU-UP and CU-CP standby pods in a cloud-native 5G wireless telecommunication network in accordance with an embodiment described herein.

FIG. 2A is a diagram of a cloud-native system 202 for CU-UP and CU-CP standby pods in a cloud-native 5G wireless telecommunication network in accordance with an embodiment described herein.

In the present example embodiment of FIG. 2A, shown is a cluster 206 of cloud-native network function (CNF) node groups, such as node group 208, node group 226 and node group 238, hosted within a local zone 204 of a cloud computing service provider cloud. In an example embodiment, the CNF corresponds to and is implemented by one or more software containers of one or more respective pods for scheduling and execution on one or more respective nodes in a software container orchestration platform that automates deployment, management, and scaling of containerized software applications. The node groups are those of cloud compute instances hosting a plurality of 5G NR centralized unit (CU) CNFs of a wireless telecommunication service provider. For example, the node groups may be those of cloud compute instances hosting the CU 102 within cloud computing service provider local zone 1 (AZ-1) 124 of FIG. 1. Each node group is overprovisioned with one or more spare cloud compute instances within the node group in case any of the CNF instances or eight cloud compute instances of the node group fails. The spare cloud compute instances are dedicated to the wireless telecommunication service provider and pre-provisioned to host CU CNFs of a same type as that hosted by the node group.

For example, CU control plane (CU-CP) node group 208 is generated to include eight cloud compute instances (cloud compute instance 1 210, cloud compute instance 2 215 to cloud compute instance 8 216) dedicated to the wireless telecommunication service provider, with each cloud compute instance of the eight cloud compute instances dedicated to hosting three respective CU-CP CNF instances. For example, cloud compute instance 1 210 hosts the CU-CP CNF instances CU-CP-1 212 to CU-CP-3 214. CU-CP node group 208 is also overprovisioned by being generated to also include two spare cloud compute instances for the CU-CP node group 208 (spare cloud compute instance 218 and spare cloud compute instance 220) dedicated to the wireless telecommunication service provider. Each spare cloud compute instance for the CU-CP node group 208 (e.g., spare cloud compute instance 218) is pre-provisioned to host three CU-CP CNF instances in case any CU-CP CNF instances of the CU-CP node group 208 fails or any of the eight cloud compute instances (cloud compute instance 1 210, cloud compute instance 2 215 to cloud compute instance 8 216) fails.

A control plane of the cluster 206 may detect such failures and control automatically switching over to the spare cloud compute instances. In an example embodiment, the cloud computing service provider is Amazon Web Services (AWS), the cloud compute instances are Amazon Elastic Compute Cloud (EC2) instances and the software container orchestration platform is the Amazon Elastic Kubernetes Service (Amazon EKS). For example, Kubernetes configurations may be used to detect and relocate impacted pods in the event of failure to another EC2 within the node group. In the present example, a single EKS cluster (e.g., cluster 1 206) will manage 24 CU pairs (24 CU-CPs in CU-CP Node Group 208, 24 CU user plane CNF instances (CU-UPs) across CU-CP Node Group 1 226 and CU-CP Node Group 2 238) and management nodes in Node Group 239. In particular, CU-CP Node Group 1 226 includes 12 CU-UP CNF instances in four EC2 instances, which include EC2 instance 1 228 to EC2 instance 4 230. This provides the ability to support up to 10 Gbps traffic across 12 CU-UPs. CU-CP Node Group 1 226 also includes a spare EC2 instance 232. However, other cloud computing service providers, cloud compute instances and software container orchestration platforms may be used.

Also, in the present embodiment, all CU-CPs within an EKS cluster (e.g., cluster 1 206) will be part of the same node group (e.g., CU-CP Node Group 208) and are mapped to a single virtual router (V-Router) pair 222. Control elements (such as, for example, Mavenir control elements software deployment as a service (SDaaS), Mavenir Telco Cloud Integration Layer (MTCIL), and Cloud Range Data Layer (CRDL)) are in a separate Node Group 239, but mapped to the same V-Router pair 222 managing CU-CP Node Group 208. Also, CU-CUP Node Group 1 226 is mapped to a single V-Router pair 234 and CU-CUP Node Group 2 238 (which also includes a spare EC2 instance) is mapped to a single V-Router pair 235. In an example embodiment, the overprovisioning the dedicated node group (e.g., CU-CP Node group 208) with one or more spare cloud compute instances includes overprovisioning the dedicated node group such that 20% of the cloud compute instances within the node group are spare cloud compute instances.

Furthermore, to further increase high availability of 5G telecommunication services, standby pods may be generated for microservices of CU-CP CNFs, such as CNF instance CU-CP-1 212 (also referred to herein as a CU-CP pod), that run on other cloud compute instances, including the spare cloud compute instances. The standby pods running on the other cloud compute instance are generated with anti-affinity between the CU-CP microservices of the primary CNF instance (e.g., CNF instance CU-CP-1 212) and CU-CP microservices of the standby pod, such that one or more of the CU-CP microservices of the primary CNF instance (e.g., CNF instance CU-CP-1 212) running on cloud compute instance 1 can instead be run on standby pods of another cloud compute instance, such as spare cloud compute instance 218. This enables resiliency at the application layer. In Kubernetes, pod affinity/anti-affinity allows one to constrain or allow on which nodes a pod is eligible to be scheduled on based on the labels on other pods and to specify rules about how pods should be placed relative to one another, for example to spread or pack pods within a service or relative to pods in other services.

For example, CU-CP standby pods with anti-affinity for microservices of CU-CP CNFs being hosted on different cloud compute instances of Node Group 208 may be running on spare cloud compute instance 218 and/or spare cloud compute instance 220 of Node Group 208. Then, in response to the control plane of cluster 1 206 detecting a failure of microservices of a CU-UP pod or a CU-CP pod (e.g., CNF instance CU-CP-1 212) running on a cloud compute instance within node group Node Group 208, the control plane of cluster 1 206 automatically switches to running the microservices of CNF instance CU-CP-1 212 for which failure was detected on a standby pod running on spare cloud compute instance 218. In the present example embodiment, the standby pod has user equipment (UE) context (e.g., of the smartphone on which a call is being made) corresponding to the microservices for which failure was detected. Thus, the automatic switching to run the microservices for which failure was detected on the standby pod running on the spare cloud compute instance avoids a dropped call. In some embodiments, such standby pods may also or instead be provisioned and run on other cloud compute instances of the node group than the spare cloud compute instances.

Figure 2B:
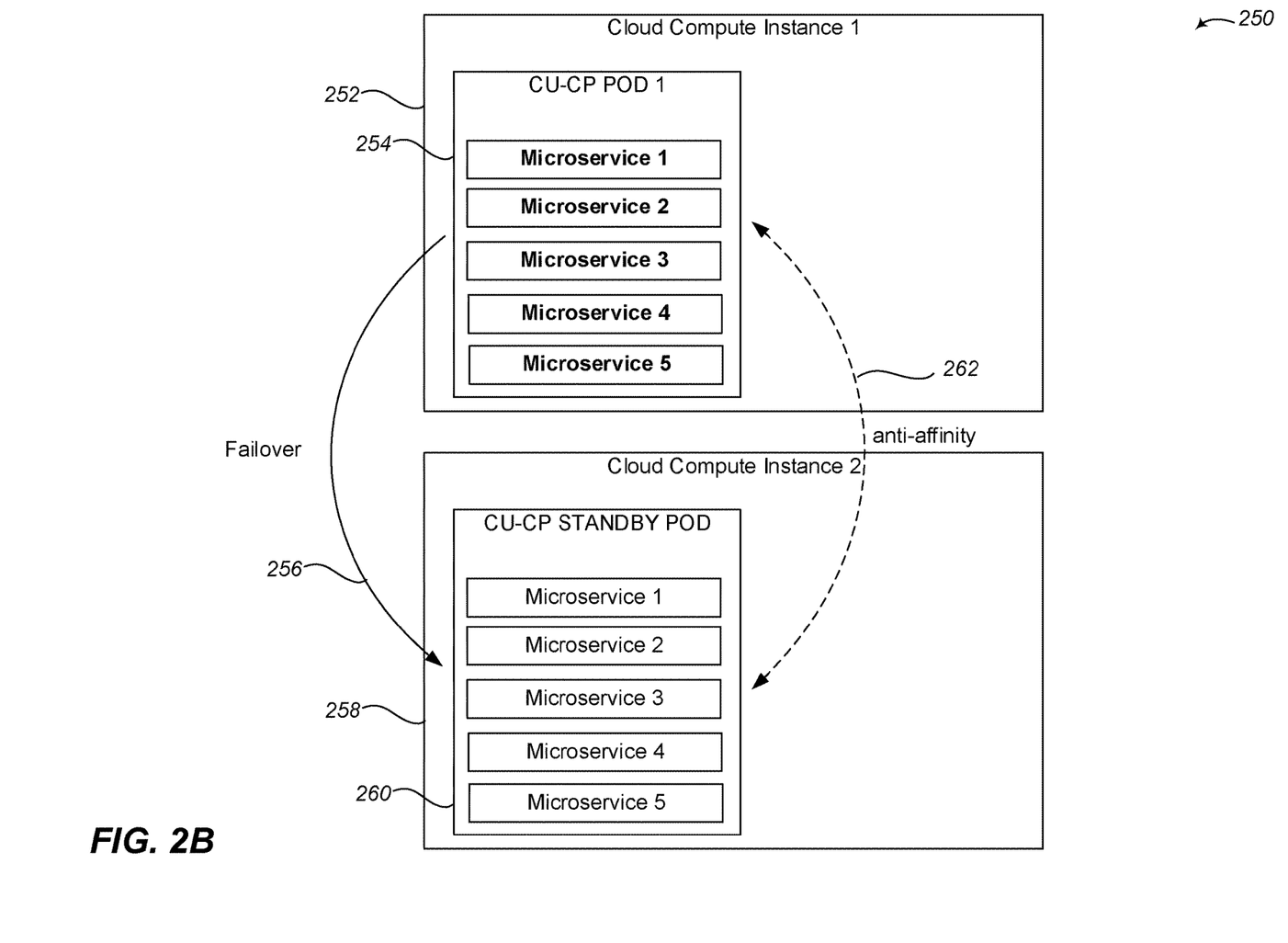
FIG. 2B is a diagram of a failover relationship between a CU-CP pod and a CU-CP standby pod in a cloud-native 5G wireless telecommunication in accordance with AN embodiment described herein.

FIG. 2B is a diagram of a failover relationship 250 between a CU-CP pod 1 254 and a CU-CP standby pod 260 in a cloud-native 5G wireless telecommunication in accordance with an embodiment described herein.

In the present example, cloud compute instance 1 252 may represent cloud compute instance 1 210 of FIG. 2A and CU-CP pod 1 254 may represent CNF instance CU-CP-1 212 of FIG. 2A. Also, cloud compute instance 2 258 may represent spare cloud compute instance 218 of FIG. 2A. As shown, cloud compute instance 1 252 is hosting CU-CP pod 1 254 and cloud compute instance 2 258 is hosting CU-CP standby pod 260. As shown CU-CP pod 1 254 has five CU-CP microservices associated with it (which may differ in various embodiments), which have anti-affinity 262 with five corresponding CU-CP microservices associated with CU-CP standby pod 260. The five corresponding CU-CP microservices associated with CU-CP standby pod 260 also have, as applicable, the user equipment (UE) context of the five CU-CP microservices associated with CU-CP pod 1 254. This enables nearly instantaneous failover 256 from one or more of the five CU-CP microservices associated with CU-CP pod 1 254 to corresponding CU-CP microservices associated with CU-CP standby pod 260, should failure be detected of the CU-CP pod 1 254.

Figure 3:
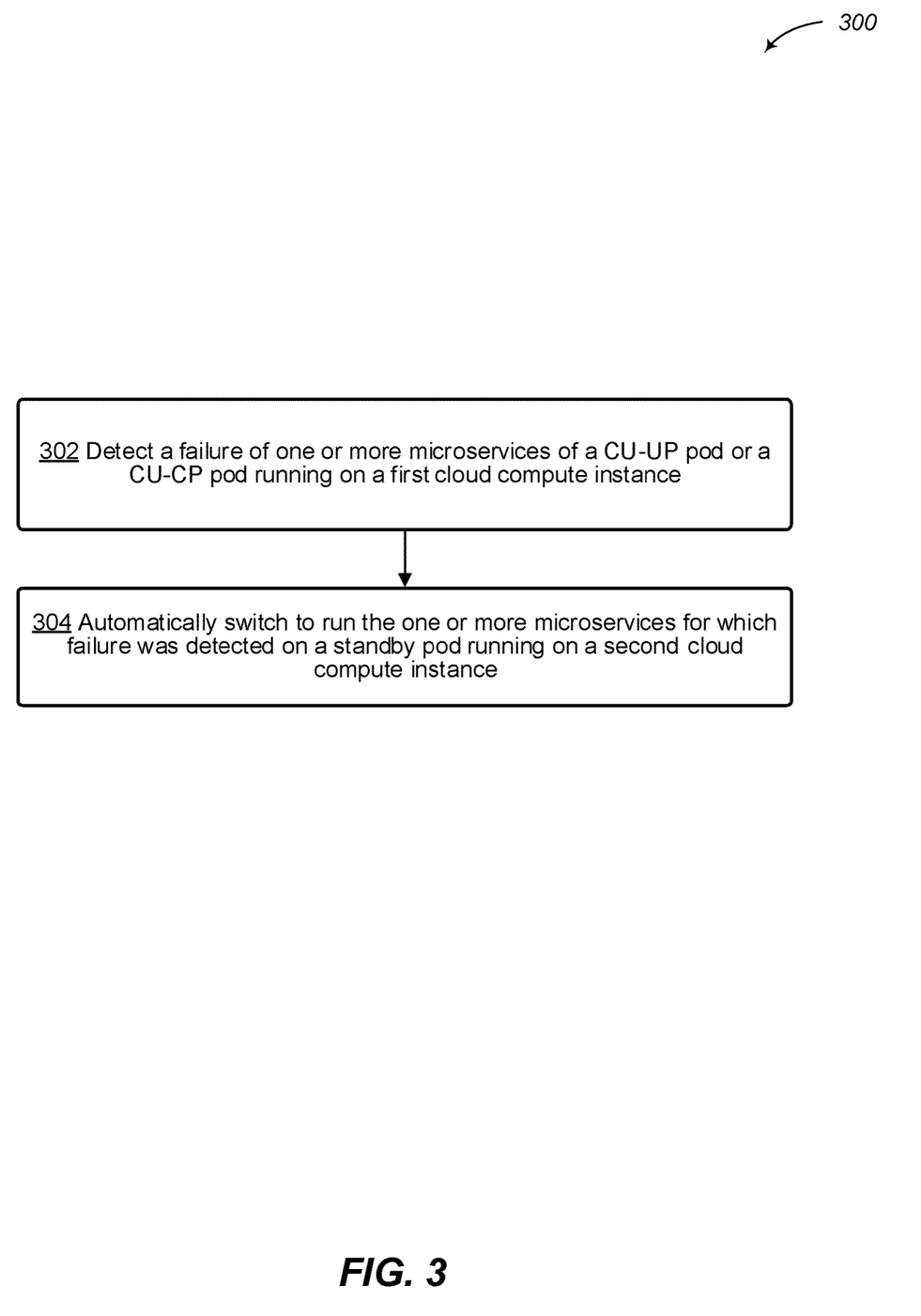
FIG. 3 illustrates a logical flow diagram showing an example embodiment of a process for failover of CU-UP and CU-CP cloud-native microservices in a 5G wireless telecommunication network in accordance with embodiments described herein.

FIG. 3 illustrates a logical flow diagram showing an example embodiment of a process 300 for failover of CU-UP and CU-CP cloud-native microservices in a 5G wireless telecommunication network in accordance with embodiments described herein.

At 302 the system 100, detects a failure of one or more microservices of a CU-UP pod or a CU-CP pod running on a first cloud compute instance within a node group of a cluster.

At 304, the system 100, in response to the detection of a failure of one or more microservices of a CU-UP pod or a CU-CP pod of a node group within a cluster being hosted on a first cloud compute instance, automatically switches to run the one or more microservices for which failure was detected on a standby pod running on a second cloud compute instance with user equipment (UE) context corresponding to the one or more microservices for which failure was detected.

Figure 4:
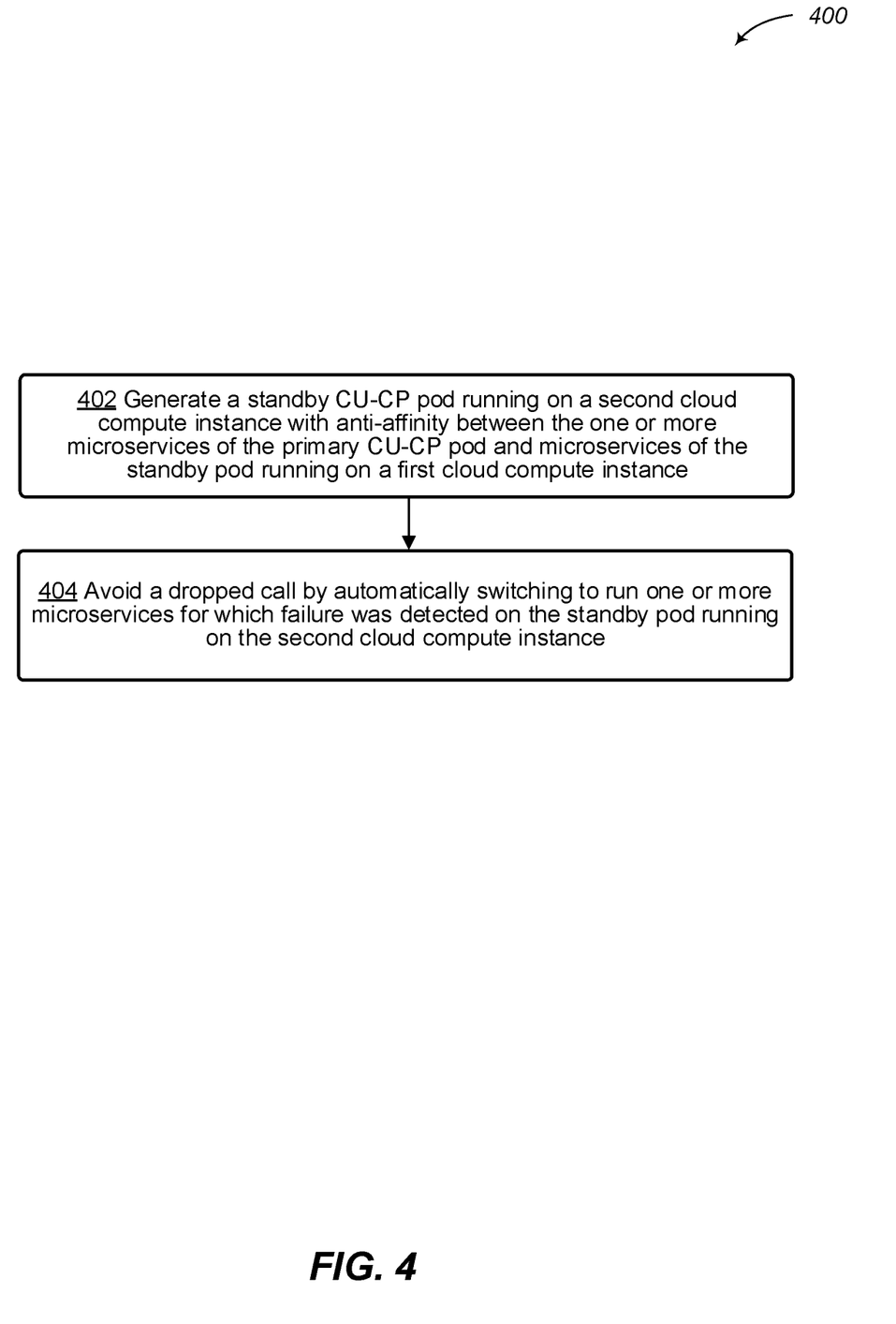
FIG. 4 illustrates a logical flow diagram showing an example embodiment of a process for avoiding a dropped call using failover of CU-UP and CU-CP cloud-native microservices in a 5G wireless telecommunication network in accordance with embodiments described herein.

FIG. 4 illustrates a logical flow diagram showing an example embodiment of a process 400 for avoiding a dropped call using failover of CU-UP and CU-CP cloud-native microservices in a 5G wireless telecommunication network in accordance with embodiments described herein.

At 402, the system 100, before the detection of the failure of the one or more microservices, generates the standby pod running on a second cloud compute instance with anti-affinity between the one or more microservices and microservices of the standby pod running on a first cloud compute instance. The system 100 generates the standby pod running on the second cloud compute instance within the node group of the cluster referenced in the process 300.

At 404, the system 100, avoids a dropped call by automatically switching to run one or more microservices associated with the call, for which failure was detected, on the standby pod running on the second cloud compute instance.

Figure 5:
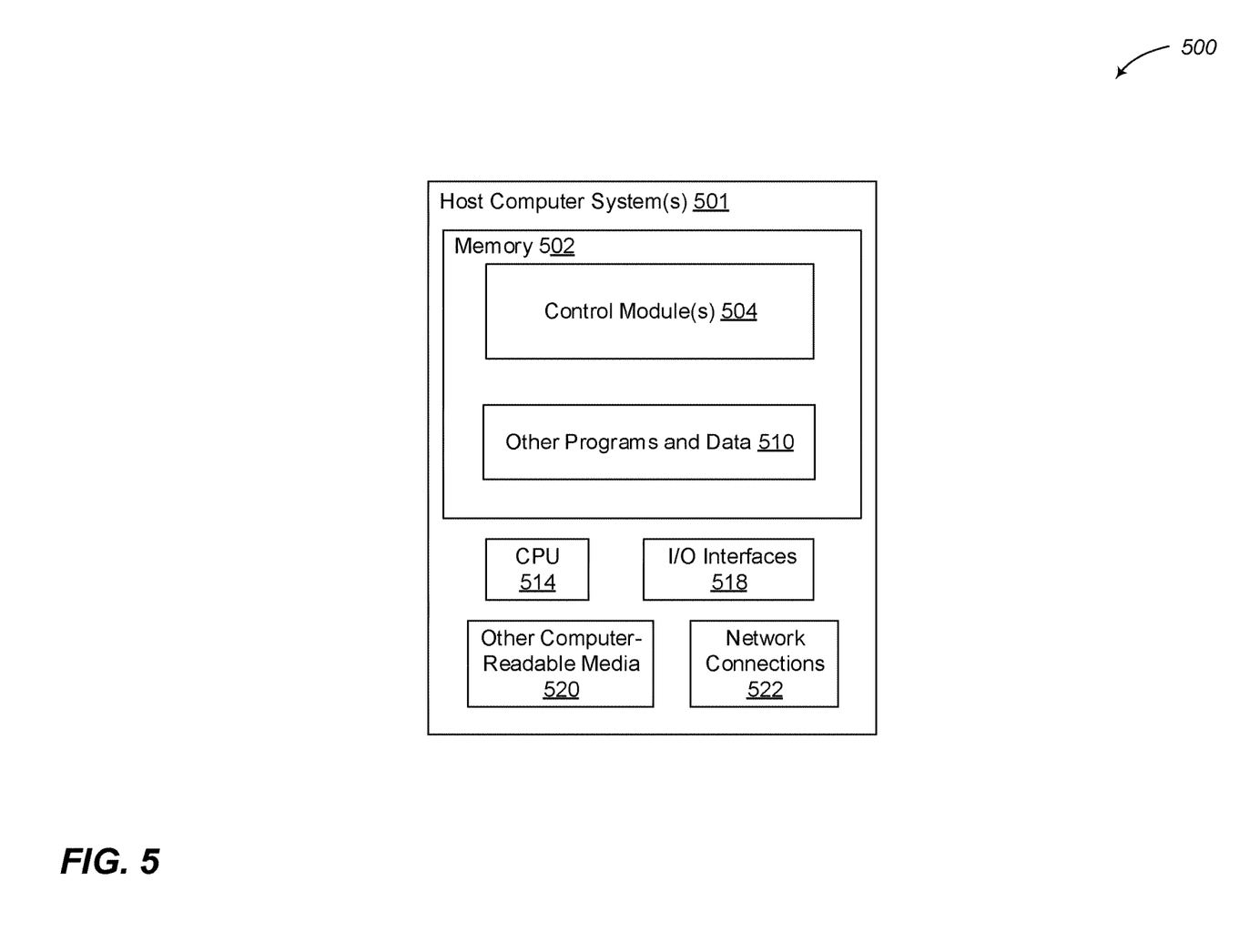
FIG. 5 shows a system diagram that describes an example implementation of a computing system(s) for implementing embodiments described herein.

FIG. 5 shows a system diagram that describes an example implementation of a computing system or systems 501 for implementing embodiments described herein.

The functionality described herein for CU-UP and CU-CP standby pods in a cloud-native 5G wireless telecommunication network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they are agnostic to the underlying cloud infrastructure, allowing higher deployment agility and flexibility. However, FIG. 5 illustrates an example of underlying hardware on which such software and functionality may be hosted and/or implemented.

In particular, shown is example host computer system(s) 501. For example, such computer system(s) 501 may represent one or more of those in various data centers, base stations and cell sites shown and/or described herein that are, or that host or implement the functions of: routers, components, microservices, nodes, node groups, control planes, clusters, virtual machines, NFs, and other aspects described herein for CU-UP and CU-CP standby pods in a cloud-native 5G wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein for CU-UP and CU-CP standby pods in a cloud-native 5G wireless telecommunication network. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for failover of centralized unit user plane (CU-UP) and centralized unit control plane (CU-CP) cloud-native microservices in a fifth generation (5G) wireless telecommunication network, the method comprising:
    detecting a failure of one or more microservices of a CU-UP pod or a CU-CP pod running on a first cloud compute instance within a node group of a cluster;
    in response to the detection of a failure of one or more microservices of a CU-UP pod or a CU-CP pod of a node group within a cluster being hosted on a first cloud compute instance, automatically switching to run the one or more microservices for which failure was detected on a standby pod running on a second cloud compute instance with user equipment (UE) context corresponding to the one or more microservices for which failure was detected; and
    avoiding a dropped call by the automatically switching to run the one or more microservices for which failure was detected on the standby pod running the second cloud compute instance, wherein:
    anti-affinity between the one or more microservices and microservices of the standby pod constrains or allows on which nodes the CU-UP pod or the CU-CP pod are eligible to be scheduled on based on labels on the standby pod and specifies rules about how the CU-UP pod or CU-CP pod should be placed relative to the standby pod; and
    the node group is overprovisioned with one or more spare cloud compute instances, including the second cloud compute instance, within the node group in case the first cloud compute instance fails and the second cloud compute instance is pre-provisioned to host centralized unit (CU) cloud-native network function (CNFs) of a same type as that hosted by the node group.

2. The method of claim 1, further comprising:
    before the detection of the failure of the one or more microservices, generating the standby pod running on the second cloud compute instance with anti-affinity between the one or more microservices and microservices of the standby pod.

3. The method of claim 2, wherein generating the standby pod running on the second cloud compute instance includes:
    generating the standby pod running on the second cloud compute instance within the node group of the cluster.

4. A system for failover of centralized unit user plane (CU-UP) and centralized unit control plane (CU-CP) cloud-native microservices in a fifth generation (5G) wireless telecommunication network, the system comprising:
    at least one memory that stores computer executable instructions; and
    at least one processor that executes the computer executable instructions to cause actions to be performed, the actions including:
        detecting a failure of one or more microservices of a CU-UP pod or a CU-CP pod running on a first cloud compute instance within a node group of a cluster; and
        in response to the detection of a failure of one or more microservices of a CU-UP pod or a CU-CP pod of a node group within a cluster being hosted on a first cloud compute instance, automatically switching to run the one or more microservices for which failure was detected on a standby pod running on a second cloud compute instance with user equipment (UE) context corresponding to the one or more microservices for which failure was detected; and
        avoiding a dropped call by the automatically switching to run the one or more microservices for which failure was detected on the standby pod running the second cloud compute instance, wherein:
        anti-affinity between the one or more microservices and microservices of the standby pod constrains or allows on which nodes the CU-UP pod or the CU-CP pod are eligible to be scheduled on based on labels on the standby pod and specifies rules about how the CU-UP pod or CU-CP pod should be placed relative to the standby pod; and
        the node group is overprovisioned with one or more spare cloud compute instances, including the second cloud compute instance, within the node group in case the first cloud compute instance fails and the second cloud compute instance is pre-provisioned to host centralized unit (CU) cloud-native network function (CNFs) of a same type as that hosted by the node group.

5. The system of claim 4, wherein at least one processor executes the computer executable instructions to cause further actions to be performed, the further actions including:
    before the detection of the failure of the one or more microservices, generating the standby pod running on the second cloud compute instance with anti-affinity between the one or more microservices and microservices of the standby pod.

6. The system of claim 5, wherein generating the standby pod running on the second cloud compute instance includes:
    generating the standby pod running on the second cloud compute instance within the node group of the cluster.

7. A non-transitory computer-readable storage medium having computer-executable instructions stored thereon that, when executed by at least one processor, cause the at least one processor to cause actions to be performed, the actions including:
    detecting a failure of one or more microservices of a CU-UP pod or a CU-CP pod running on a first cloud compute instance within a node group of a cluster;
    in response to the detection of a failure of one or more microservices of a CU-UP pod or a CU-CP pod of a node group within a cluster being hosted on a first cloud compute instance, automatically switching to run the one or more microservices for which failure was detected on a standby pod running on a second cloud compute instance with user equipment (UE) context corresponding to the one or more microservices for which failure was detected; and
    avoiding a dropped call by the automatically switching to run the one or more microservices for which failure was detected on the standby pod running the second cloud compute instance, wherein:
    anti-affinity between the one or more microservices and microservices of the standby pod constrains or allows on which nodes the CU-UP pod or the CU-CP pod are eligible to be scheduled on based on labels on the standby pod and specifies rules about how the CU-UP pod or CU-CP pod should be placed relative to the standby pod; and the node group is overprovisioned with one or more spare cloud compute instances, including the second cloud compute instance, within the node group in case the first cloud compute instance fails and the second cloud compute instance is pre-provisioned to host centralized unit (CU) cloud-native network function (CNFs) of a same type as that hosted by the node group.

8. The non-transitory computer-readable storage medium of claim 7, wherein the computer-executable instructions, when executed by the at least one processor, cause the at least one processor to cause further actions to be performed, the further actions including:

before the detection of the failure of the one or more microservices, generating the standby pod running on the second cloud compute instance with anti-affinity between the one or more microservices and microservices of the standby pod.

9. The non-transitory computer-readable storage medium of claim 8, wherein generating the standby pod running on the second cloud compute instance includes:

generating the standby pod running on the second cloud compute instance within the node group of the cluster.

* * * * *